US006833043B1

(12) United States Patent
Parsonage et al.

(10) Patent No.: US 6,833,043 B1
(45) Date of Patent: *Dec. 21, 2004

(54) ELASTOMER COMPOSITIONS FOR BONDING TO FLUOROPOLYMERS

(75) Inventors: Edward E. Parsonage, St. Paul, MN (US); Robert E. Kolb, Afton, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 343 days.

(21) Appl. No.: 09/479,575

(22) Filed: Jan. 7, 2000

Related U.S. Application Data

(62) Division of application No. 08/994,378, filed on Dec. 19, 1997, now Pat. No. 6,482,522.

(51) Int. Cl.[7] ........................ B32B 31/26; C09J 101/00; C09J 201/00; C09J 4/00
(52) U.S. Cl. .................... 156/307.1; 156/297; 156/333; 156/329; 156/330.9; 156/331.1; 156/331.8
(58) Field of Search ............................. 428/35.7, 36.8, 428/36.91, 421, 422, 446, 447, 448, 451, 213, 500, 515, 524.2, 524.6

(56) References Cited

U.S. PATENT DOCUMENTS

| | | | | |
|---|---|---|---|---|
| 3,158,580 A | | 11/1964 | Vandenberg ................... 260/2 |
| 3,158,581 A | | 11/1964 | Vandenberg ................... 260/2 |
| 3,726,841 A | | 4/1973 | Mirolli et al. ................ 260/79 |
| 4,233,421 A | | 11/1980 | Worm ........................ 525/343 |
| 4,287,322 A | | 9/1981 | Worm ........................ 525/403 |
| 4,335,238 A | | 6/1982 | Moore et al. ............... 526/254 |
| 4,912,171 A | | 3/1990 | Grootaert et al. ........... 525/340 |
| 4,933,060 A | | 6/1990 | Prohaska et al. ...... 204/192.36 |
| 5,047,287 A | | 9/1991 | Horiuchi et al. ............ 428/248 |
| 5,086,123 A | | 2/1992 | Guenthner et al. ......... 525/276 |
| 5,170,011 A | | 12/1992 | Martucci ..................... 174/47 |
| 5,242,976 A | | 9/1993 | Strassel et al. ............... 525/72 |
| 5,262,490 A | | 11/1993 | Kolb et al. ................. 525/343 |
| 5,284,184 A | | 2/1994 | Noone et al. ............... 138/121 |
| 5,319,025 A | * | 6/1994 | Weigelt ....................... 525/151 |
| 5,383,087 A | | 1/1995 | Noone et al. ............... 361/215 |
| 5,427,831 A | | 6/1995 | Stevens ..................... 428/36.2 |
| 5,512,225 A | | 4/1996 | Fukushi ...................... 264/127 |
| 5,830,947 A | * | 11/1998 | Blong et al. ................ 525/187 |
| 5,855,977 A | * | 1/1999 | Fukushi et al. ............ 428/36.6 |

FOREIGN PATENT DOCUMENTS

| | | | |
|---|---|---|---|
| CA | 2147045 | 4/1995 | ......... C08F/214/26 |
| EP | 0185590 | 6/1986 | ............. C08J/5/12 |
| EP | 0 303 244 A2 | 2/1989 | ............. C08J/5/12 |
| EP | 0523644 | 1/1993 | ........... B32B/27/08 |
| EP | 0551094 | 7/1993 | ............. B32B/7/04 |
| EP | 0 759 354 A1 | 2/1997 | ............ B29D/9/00 |

OTHER PUBLICATIONS

F. W. Billmeyer, *Textbook of Polymer Science*, 3rd ed., pp 398–403, John Wiley & Sons, New York (1984).
R. A. Brullo, "Fluoroelastomer Rubber for Automotive Applications", *Automotive Elastomer & Design*, Jun. 1985.
R. A. Brullo, "Fluoroelastomers Seal Up Automotive Future", *Materials Engineering*, Oct. 1988.
Grootaert, W.M., Millet, G.H., Worm, A.T., "Fluorocarbon Elastomers", Kirk–Othmer, *Encyclopedia of Chemical Technology*, 4th Ed., vol. 8 pp 900–1005, John Wiley & Sons, New York (1993).
"Organic Fluorine Compounds", Kirk–Othmer, *Encyclopedia of Chemical Technology*, vol. 11, pp 20, 21, 32, 33 ,40, 41, 48, 50, 52, 62, 70, and 71, John Wiley & Sons, New York (1980).
American Society for Testing and Materials (ASTM) D–1876, "Standard Test Method for Peel Resistance of Adhesives".
American Society for Testing and Materials (ASTM) D–1976, "Standard Test Method for Elements in Water by Inductively–Coupled Argon Plasma Atomic Emission Spectroscopy".
Database WPI, Week 8344, Derwent Publications Ltd., London, GB; AN83–805331; XP002077673 & JP 58 162336 A (Tokai Rubber Ind Ltd) Sep. 27, 1983, Abstract Only.
Database WPI, Week 8344, Derwent Publications Ltd., London, GB; An 83–805330; XP002077674 & JP 58 162335 A (Tokai Rubber Ind Ltd) Sep. 27, 1983, Abstract Only.
Database WPI, Week 9330, Derwent Publications Ltd., London, GB; AN 93–240417; XP002077675 & JP 05 164273 A (Daikin Kogyo KK) Jun. 29, 1993, Abstract Only.

* cited by examiner

*Primary Examiner*—Harold Pyon
*Assistant Examiner*—Michael Miggins
(74) *Attorney, Agent, or Firm*—James V. Lilly; Dean M. Harts

(57) ABSTRACT

A method for increasing the adhesion of a first layer comprising a fluoropolymer substantially free of interpolymerized units derived from vinylidene fluoride to a second layer comprising a curable elastomer is described. The method comprises adding a dehydrofluorinating composition to the curable elastomer, contacting the layers and curing the layered article so formed. The resulting multilayer compositions and articles are also disclosed.

16 Claims, No Drawings

ELASTOMER COMPOSITIONS FOR BONDING TO FLUOROPOLYMERS

This is a divisional of application Ser. No. 08/994,378, filed Dec. 19, 1997, now U.S. Pat. No. 6,482,522 B1.

FIELD OF THE INVENTION

The invention relates to multi-layer compositions comprising a fluoropolymer and a curable elastomer as well as to methods of producing same. In another aspect, this invention relates to methods of improving the adhesion between a fluoropolymer and other dissimilar materials, such as, epichlorohydrin and nitrile-butadiene elastomers.

BACKGROUND OF THE INVENTION

Fluorine-containing polymers (i.e., fluoropolymers or fluorinated polymers), are an important class of polymers that include, for example, fluoroelastomers and fluoroplastics. Among this broad polymer class are polymers of high thermal stability, polymers of extreme toughness, and polymers exhibiting usefulness along a broad range of temperatures. Many of these polymers also are almost totally insoluble in a wide variety of organic solvents; see, for example, F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers such as hexafluoropropene, find particular utility in high temperature applications, such as in seal gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and Grootaert, W. M., Millet, G. H., Worm, A. T., "Fluorocarbon Elastomers," Kirk-Othmer, *Encyclopedia of Chemical Technology*, 4th ed., Vol. 8, pp. 990–1005, John Wiley & Sons, New York (1993).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, as wire coatings, electrical components, seals, and in solid and lined pipes and piezoelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Multi-layer constructions containing a fluorinated polymer enjoy wide industrial application; multi-layer fluoropolymer constructions find utility in, for example, fuel line hoses and related containers and hoses or gaskets in the chemical processing field. Increased concerns with evaporative fuel standards give rise to a need for fuel system components that have increased barrier properties to minimize the permeation of fuel or fuel vapors through automotive components, such as fuel filler lines, fuel supply lines, fuel tanks, and other components of the engine's fuel or vapor recovery systems. Various types of tubing have been proposed to address these concerns.

Adhesion between the layers of a multi-layered article may need to meet various performance standards depending on the use of the finished article. A variety of methods can be used to increase the adhesion between a fluorinated polymer layer and a non-fluorinated polymer layer. An adhesive layer can, for example, be added between the two polymer layers. U.S. Pat. No. 5,047,287 (Horiuchi et al.) discloses a diaphragm, suitable for use in automotive applications, that comprises a base fabric having bonded to at least one surface a fluororubber layer by an adhesive that includes an acrylonitrile-butadiene or acrylonitrile-isoprene rubber having an amino group. Blends of the fluoropolymer and the non-fluorinated polymer layer themselves are in some cases employed as an intermediate layer to help bond the two layers together. European Patent Application 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer. U.S. Pat. No. 5,242,976 (Strassel et al.) discloses co-extruding vinylidene polyfluoride with an alkyl polymethacrylate and vinylidene polyfluoride composition.

Surface treatment of one or both of the layers sometimes is employed to aid bonding. Some, for example, have taught treating fluoropolymer layers with charged gaseous atmosphere and applying subsequently a layer of a second material, for example a thermoplastic polyamide. E.g., European Patent Applications 0185590 (Ueno et al.) and 0551094 (Krause et al.) and U.S. Pat. No. 4,933,060 (Prohaska et al.) and U.S. Pat. No. 5,170,011 (Martucci).

Numerous methods of bonding have been proposed for multi-layer constructions where the fluoropolymer layer contains a molecular structure resulting from the inclusion of a vinylidene fluoride (VDF) or similar monomer unit. Similar monomers in this sense mean those monomers other than VDF which when polymerized, form monomer sequences similar to polymerized vinylidene fluoride. In general, these fluoropolymers will readily dehydrofluorinate when exposed to a base. As a result, such fluoropolymers undergo relatively facile adhesion promoting reactions. These other such monomers include ethylenically unsaturated monomers which, when incorporated into fluoropolymers, can produce a similar (including an identical) polymeric microstructure as the polymerized VDF. These similarly formed polymers are also prone to dehydrofluorination and subsequent adhesion promoting reactions. In general, the microstructure of a hydrogen bonded carbon atom between fluorine bonded carbon atoms creates a site reactive to a base. The reactivity of a hydrogen bonded carbon is further enhanced when its carbon atom is adjacent to, or attached to a carbon atom possessing a carbon bonded —CF3 group (supplied by HFP or 2-hydropentafluoropropylene for instance) or another electron withdrawing group. Monomers suitable for forming such hydrogen-bonded-carbon reactive sites include, but are not limited to, VDF, 1-hydropentafluoropropene, 2-hydropentafluoropropene, and trifluoroethylene.

The addition of a primary amine containing unsaturated compound to a hydrocarbon elastomer layer is disclosed as a method for increasing the adhesion to a layer comprising fluoropolymer comprising interpolymerized units derived from vinylidene fluoride in U.S. Pat. No. 5,512,225 (Fukushi).

SUMMARY OF THE INVENTION

Multi-layer constructions containing a fluoropolymer without the VDF segment or a similar easily dehydrofluorinated segment as discussed above and below, are much more difficult to make with adequate interlayer bond strength. These types of construction are desirable however, because fluoropolymers without a segment readily susceptible to dehydrofluorinating are more chemically inert. For example, tubes or hoses or other containers used in fuel or chemical applications where inertness, permeation reduction and interlayer adhesion improvement are important, will benefit from the improvement described in this invention.

As the above discussion illustrates, the combined features of curable elastomer compounds and fluoropolymer materials are a desirable combination, particularly when the fluoropolymer possesses improved chemical resistance or permeation properties.

In one aspect, this invention relates to a method of bonding a fluoropolymer to a curable elastomer comprising the steps of: a) providing; (i) a fluoropolymer layer comprising a fluorine-containing polymer derived from interpolymerized units of at least one fluorine-containing olefinically unsaturated monomer, with the proviso that if a perfluorinated monomer is present then at least one monomer that contains hydrogen atoms is also present and with the further proviso that the monomer(s) include neither vinylidene fluoride nor a monomer which when polymerized forms a micro structure similar to polymerized vinylidene fluoride, (ii) a curable elastomer, and (iii) a dehydrofluorinating composition, b) forming a layer comprising a mixture of the curable elastomer and an effective amount of the dehydrofluorinating composition, c) forming a multi-layer article by contacting the layer of the mixture with the layer comprising the fluoropolymer, and d) curing the multi-layer article under conditions sufficient to provide an interlayer adhesion between the curable elastomer layer and the fluoropolymer layer of at least 2 Newtons per cm of width. The dehydrofluorinating composition is preferably selected from the group consisting of at least one of an organo-onium and an amidine. The curable elastomer is preferably selected from the group consisting of at least one of an epichlorohydrin-containing elastomer, a nitrile rubber-containing elastomer, ethylene propylene diene copolymers, silicone-containing elastomers, fluoroelastomers, and mixtures thereof.

In another aspect, the invention relates to a method of bonding a fluoropolymer to a curable elastomer comprising the steps of: a) providing; (i) a layer of a fluoropolymer comprising a copolymer derived from interpolymerized units of a first monomer selected from the group consisting of hexafluoropropylene, a perfluoroalkyl vinyl ether, a branched perfluorinated monomer, and combinations thereof, a second monomer selected from the group consisting of tetrafluoroethylene, chlorotrifluoroethylene, a fully halogenated olefinically unsaturated monomer containing two carbon atoms and combinations thereof, a third monomer selected from the group consisting of ethylene, propylene, a non-halogenated olefinically unsaturated monomer and combinations thereof, (ii) a curable elastomer, and (iii) a dehydrofluorinating composition, b) forming a layer comprising a mixture of the curable elastomer and an effective amount of the dehydrofluorinating composition, c) forming a multi-layer article by contacting the layer of the mixture with the layer comprising the fluoropolymer, and d) curing the multi-layer article under conditions sufficient to provide an interlayer adhesion between the curable elastomer layer and the fluoropolymer layer of at least 2 Newtons per cm of width.

In still a further aspect, this invention relates to a method of bonding a fluoropolymer to a curable elastomer comprising the steps of: a) providing; (i) a layer of a fluoropolymer comprising a copolymer having a hexafluoropropylene monomer content of at least 22% by weight and an ethylene monomer content of at least 14% by weight wherein said copolymer is derived from interpolymerized units comprising hexafluoropropylene, tetrafluoroethylene, and ethylene, (ii) a curable elastomer, and (iii) a dehydrofluorinating composition, b) forming a layer comprising a mixture of the curable elastomer and an effective amount of the dehydrofluorinating composition, c) forming a multi-layer article by contacting the layer of the mixture with the layer comprising the fluoropolymer, and d) curing the multi-layer article.

Another aspect of the invention relates to a layered article comprising a first and second layer in intimate contact with one another. The first layer comprises a fluoropolymer substantially free of interpolymerized units derived from vinylidene fluoride or monomers which give a similar microstructure when polymerized. The second layer comprises a mixture of a curable elastomer and a dehydrofluorinating composition. The interlayer adhesion between the first layer and the second layer is at least 2 Newtons per cm of width. The a fluoropolymer used in the first layer may also be a fluorine-containing polymer derived from interpolymerized units of at least one fluorine-containing olefinically unsaturated monomer, with the proviso that of a perfluorinated monomer is present then at least one monomer that contains hydrogen atoms is also present and with the further proviso that the monomer(s) include neither vinylidene fluoride nor a monomer which when polymerized forms a micro structure similar to polymerized vinylidene fluoride.

The invention also relates to a layered article comprising a first layer comprising a fluoropolymer derived from interpolymerized units comprising hexafluoropropylene, tetrafluoroethylene, and ethylene, and a second layer comprising a mixture of a curable elastomer and a dehydrofluorinating composition. The first and second layers are in substantial contact with each other. The interlayer adhesion between the first and second layers is at least 2 Newtons per cm of width.

The layers discussed herein are intended to include the concept of a surface, such as that found when constructing a multilayered hose or other shaped article and not intended to be limited to flat shapes. Thus, a first layer or surface may be formed or shaped prior to application of the second material. The substantial contact of the second material to the first is to a surface of the first material. Either the fluoropolymer component or the curable elastomer component may be formed or shaped first. When a shaped article, such as a hose, is formed, either material may be on the inside or the outside of the article depending upon the intended use, such as where the temperature resistance or chemical resistance is most needed.

An additional aspect of the invention also relates to a layered article comprising a first layer comprising a fluoropolymer derived from interpolymerized units comprising hexafluoropropylene, tetrafluoroethylene, and ethylene and a second layer comprising a mixture of a curable elastomer and a dehydrofluorinating composition. The fluoropolymer used in the first layer has a hexafluoropropylene monomer content of at least 22% and an ethylene monomer content of at least 14%. The two layers are in substantial contact with each other.

An additional aspect of the invention relates to a layered article comprising a first layer comprising a fluoropolymer having a melt point of no more than 190° C. derived from interpolymerized units comprising hexafluoropropylene, tetrafluoroethylene, and ethylene and a second layer comprising a mixture of a curable elastomer and a dehydrofluorinating composition. The two layers are in substantial contact with each other.

Examples of articles contemplated by this invention include a hose, a container, a gasket or a film.

DETAILED DESCRIPTION

Useful elastomers in the practice of this invention include those cured by a variety of curing agents. Such curing agents include peroxides, poly hydroxyl containing compounds (e.g. poly phenols), poly amines and sulfur or sulfur-containing curatives. These curing agents are suitable for use with epichlorohydrin containing compounds, nitrile-butadiene rubbers, ethylene propylene diene copolymers, silicone-containing elastomers and fluoroelastomers. The elastomers used may be a mixture of one or more of these listed elastomers.

In the practice of this invention, the polyepichlorohydrin containing compound (or gum (A)) is a solid, predominantly amorphous, high molecular weight (i.e. greater than about 40,000 number average molecular weight) epichlorohydrin homopolymer gum, a copolymer gum of epichlorohydrin with another cyclic ether (for example, ethylene oxide, propylene oxide, 2-butene oxide, ethyl glycidyl ether, and trimethylene oxide), or a copolymers an terpolymer with another cyclic ether which also may allow for ethylenic unsaturation. Generally useful copolymer gums will contain about 50 mol % of epichlorohydrin gum. Representative polyepichlorohydrin containing compounds useful in this invention are described in U.S. Pat. Nos. 3,158,580, 3,158,581, and 3,726,841. Commercially available polymer gums include Hydrin H homopolymers, Hydrin C copolymers, and Hydrin T terpolymers (ZEON, Louisville, Ky.).

The natural rubbers or synthetic rubbers derived from diene monomers useful in this invention include synthetic elastomers, such as nitrile-butadiene rubbers and ethylene propylene diene terpolymers, which are sulfur or peroxide curable. Nitrile-butadiene rubbers include high molecular weight, amorphous, copolymers of 1,3-butadiene ($CH_2$=CH—CH=$CH_2$) and acrylonitrile ($CH_2$=CH—CN). Suitable butadiene-acrylonitrile copolymers generally have acrylonitrile contents of from 5 to 65% by weight, preferably from 10 to 45 by weight, and butadiene contents of from 35 to 95% by weight, preferably from 55 to 90% by weight.

Nitrile-butadiene rubbers also include hydrogenated nitrile-butadiene rubbers in which some of the butadiene unsaturation is selectively hydrogenated. High temperature properties are generally superior because of this reduction in unsaturation. Commercially available hydrogenated nitrile-butadiene rubbers include Zetpol™ 2000 rubber available from Zeon Chemical, Inc.

Blends of nitrile-butadiene rubbers are also useful, such as the NBR/PVC blend commercially available from Miles, Inc., as Krynac™ NV850 blend.

Useful ethylene propylene diene terpolymers contain dienes such as 1,4-hexadiene, dicyclo pentadiene, ethylidene norbornene. Commercially available ethylene propylene diene terpolymers include EPsyn™ 5206 terpolymer, available from Copolymer & Rubber Chemical Corp.

Suitable fluorine-containing ethylenically unsaturated monomers for use in the preparation of the curable fluoroelastomer useful in this invention include the terminally unsaturated monoolefins typically used for the preparation of fluorine-containing elastomers. Such monomers include hexafluoropropene, chlorotrifluoroethylene, 2-chloropentafluoropropene, perfluoroalkyl vinyl ethers, e.g., $CF_3OCF=CF_2$ or $CF_3CF_2OCF=CF_2$, tetrafluoroethylene, dichlorodifluoroethylene, 1,1-dichlorofluoroethylene, vinylidene fluoride, vinyl fluoride, and mixtures thereof Fluorine-free terminally unsaturated monoolefin comonomers, e.g., ethylene or propylene may also be used as comonomers.

Useful dehydrofluorinating compositions useful in the invention preferably include one or more organo-onium compounds and amidine compounds. These are incorporated into the curable elastomer to improve the bonding characteristics to the fluoropolymer. As used herein, the term "dehydrofluorinating composition" refers to a composition which is capable of improving the adhesion of the curable elastomer compounds to the fluoropolymer layer. This is thought to be a result of creating unsaturation in the fluoropolymer material.

As is known in the art, an organo-onium is the conjugate acid of a Lewis base (e.g. phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the useful organo-onium compounds are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.) all of whose descriptions are herein incorporated by reference. Representative examples include the following individually listed compounds and mixtures thereof:

triphenylbenzyl phosphonium chloride,
tributylallyl phosphonium chloride,
tributylbenzyl ammonium chloride,
tetrabutyl ammonium bromide,
triphenyl sulfonium chloride,
tritolyl sulfonium chloride,
8-benzyl-1,8-diazabicyclo [5.4.0]-7-undecenium chloride,
benzyl tris(dimethylamino) phosphonium chloride and
benzyl(diethylamino)diphenylphosphonium chloride A commercial source of a useful organo onium-containing dehydrofluorinating composition is Dynamar™ Rubber Chemical FX-5166 available from Dyneon LLC of Oakdale, Minn. An effective amount of an organo onium is that amount, usually stated in parts per hundred parts rubber (phr), necessary to give improved inter layer adhesion when compared to a composition without any organo onium. Such improved adhesion is preferably at least 2 Newtons per cm of width of the test sample. This will generally mean a level of onium between 0.25 to 7 phr, preferably between 0.5 to 5 phr.

Acid acceptors are also generally added prior to curing. Suitable acid acceptors include, for example, magnesium oxide, lead oxide, calcium oxide, calcium hydroxide, calcium carbonate and dibasic lead phosphite. Mixtures of more than one acid acceptor may be used in this invention.

Another example of a useful dehydrofluorinating compositions are the amidine base compounds, such as 1,8 diazabicyclo[4.3.0]undec-7-ene(DBU) and 1,5diazabicyclo[4.3.0]non-5-ene(DBN) and salts thereof. Examples of DBU salts include salts of 1,8-diazabicyclo[5.4.0]undecene-7 with carbonates, long chain fatty acids, carboxylates, aromatic sulfonates or carboxylates, phenol salts, thiolic salts, etc. Typical examples are DBU-carbonate, DBU-stearate, DBU-naphthoate, DBU-P-hydroxy-benzoate, DBU-P-toluene-sulfonate, etc. Also included are unsubstituted or substituted phenol salts of 1,8-diazabicyclo-[5.4.0]undecene-7. Examples of such compounds include the phenol salt of 1,8-diazabicyclo-[5.4.0]undecene-7, the cresol salts of 1,8-diazabicyclo-[5.4.0]undecene-7, resorcinol salts of 1,8-diazabicyclo-[5.4.0]undecene-7 and hydroquinone salts of 1,8-diazabicyclo-[5.4.0]undecene-7. A commercial source of useful amidine-containing dehydrofluorinating compositions includes SANAPRO VCAT SA102 DBU-octanoic acid salt and VCAT SA841 DBU/phenol novolac resin salts. (Sanapro Limited, Tokyo Japan). The amount of an amidine which is useful is that amount necessary to give improved interlayer adhesion. This will generally be between 0.25 to 7 phr. A preferred level is between 0.5 to 3.0 phr.

The solubility in the curable elastomer of the material selected as the dehydrofluorinating composition may affect the quantity required to reach a useful adhesion level. A higher solubility is thought to require a lower additive level and thus may be preferred.

Additives useful in the curing of the elastomer, particularly epichlorohydrin containing compounds, composition include imidazolines, diamines, internal salts of diamines, thioureas and polyphenol curing agents as discussed in U.S. Pat. No. 4,287,322 (Worm), incorporated herein by reference. Additives useful in the curing of nitrile rubber containing compositions include peroxide compounds and sulfur-containing compounds.

Methods of incorporation of the dehydrofluorinating composition and the other required additives into the curable elastomer compounds include any of the usual rubber mixing devices, such as Banbury mixers, roll mills, or any other convenient mixing device. It has been found that a two-roll rubber mill equipped with heat exchange means, e.g., cored chambers for cooling, is particularly suitable since the heat generated by the high shearing forces in mixing can be dissipated and the temperature more accurately regulated with this device than with devices providing other means for temperature control. The temperature during mixing generally should not be allowed to rise above about 120° C. The mixture should be processed sufficiently to distribute the cross-linking agents and other ingredients uniformly throughout the gum stock. About 5 to 20 minutes or longer is recommended for this process.

Fluoropolymer materials may be described by broadly categorizing the fluoropolymers structurally into one of two basic classes. A first class includes those fluorinated homopolymers or copolymers comprising interpolymerized units derived from vinylidene fluoride or monomers which give a similar polymer micro structure. The second class includes those fluoropolymers which do not contain any significant level of such micro structure. For the purpose of this discussion, a copolymer is defined as a polymeric material resulting from the simultaneous polymerization of two or more dissimilar monomers and a homopolymer is derived from a single monomer. Thus, a fluoropolymer derived from three different monomers, sometimes called a terpolymer, is herein classified as a copolymer.

The fluoropolymers useful in the practice of the invention are those of the second class. These fluoropolymers typically do not contain VDF monomer (or any other similar monomer) at a level such that, when polymerized, produces a microstructure which is readily susceptible to reaction with a base, as described above. Hence, these fluoropolymers may be referred to as "substantially non-vinylidene fluoride (non-VDF) containing fluoropolymers." By "substantially non-VDF containing," it is meant that the fluoropolymer comprises less than 3%, preferably less than 1% by weight of interpolymerized units derived from VDF or other monomers which produce a microstructure similar to VDF as described above. Most preferably, these fluoropolymers contain no VDF or similar monomer units.

Useful fluoropolymers comprise copolymers derived from interpolymerized units of a first monomer selected from the group consisting of hexafluoropropylene (HFP), perfluoroalkyl vinyl ethers (PFAVE), branched perfluorinated olefinically unsaturated monomers and combinations thereof; a second monomer selected from the group consisting of tetrafluoroethylene TFE, chlorotrifluoroethylene CTFE, fully halogenated olefinically unsaturated monomers containing two carbon atoms and combinations thereof; a third monomer selected from the group consisting of ethylene (E), propylene (P), non-halogenated olefinically unsaturated monomers and combinations thereof Specific examples of useful fluoropolymer materials include copolymers of tetrafluoroethylene and at least 22% hexafluoropropylene (HFP) and 14% ethylene. A preferred fluoropolymer will have an ethylene content of at least 14% and an HFP) content of at least 24%. Useful fluoropolymers may also be characterized by melting point. Useful copolymers of TFE, E, and HFP will have a melting point of no greater than 190° C. and preferably no greater than 170° C.

Fluoropolymers of this class can be prepared by methods known in the fluoropolymer art. Such methods include, for example, free-radical polymerization of hexafluoropropylene and tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example U.S. Pat. No. 4,335,238 or Canadian Pat. No. 2,147,045. They may also be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

Useful multi-layer constructions may be made from the above materials selected in such a manner that an interlayer adhesion value of preferably at least 2 Newtons per cm of width will be achieved. Appropriate selections of materials will result in interlayer adhesion of at least 5 Newtons per cm of width and most preferred selections will result in interlayer adhesion of at least 10 Newtons per cm of width.

Methods known in the fluoropolymer art can be used to produce a bonded multi-layer article wherein the fluoropolymer material is in substantial contact with the curable elastomer compound. For instance, the fluoropolymer and the curable elastomer compound can be formed into thin film layers by known methods. The fluorinated layer and the curable elastomer layer can then be laminated together under heat and/or pressure to form a bonded, multi-layer article. Alternatively, the fluoropolymer and the curable elastomer compound, along with one or more additional layers where desired, can be co-extruded or cross-head extruded into a multi-layer article. See e.g., U.S. Pat. Nos. 5,383,087, and 5,284,184, whose descriptions are incorporated herein by reference for such purpose. Useful articles include those where the two layers are in substantial contact with each other.

The heat and pressure of the method by which the layers are brought together (e.g., coextrusion or lamination) should be sufficient to provide adequate adhesion between the layers. It may, however, be desirable to further treat the resulting multi-layer article, for example with additional heat, pressure, or both, to provide further adhesive bond strength between the layers. One way of supplying additional heat when the multi-layer article is prepared by extrusion includes delaying the cooling of the multi-layer article after co-extrusion or lamination. Alternatively, additional heat energy may be added to the multi-layer article by laminating or co-extruding the layers at a temperature higher than necessary for merely processing the several components. Or, as another alternative, the finished multi-layer article may be held at an elevated temperature for an extended period of time. For example the finished multi-layer article may be placed in a separate means for elevating the temperature of the article, such as an oven or heated liquid bath. A combination of these methods may also be used.

A cure step may be desired or necessary to, for example, establish fully the desired physical properties in the elastomer component of any finished article. Such cure step may include exposure to an elevated temperature, such as in a hot oven or in an autoclave treatment. This step may be in addition to the thermal exposure of the other process steps, e.g. lamination or coextrusion. Conditions and materials may be selected which accomplish both processes, e.g. the melt processing or lamination and curing, within the same temperature and pressure ranges.

Where the formation of a multi-layered article is a series of sequential steps, such as lamination of preformed sheets or multiple cross-head extrusions, an opportunity exists to treat the surface of one or both materials prior to forming the layered article. A lamination of preformed sheets allows one or more surface treatments on either or both materials before lamination. A cross-head extrusion process will allow one or more surface treatments on the first material formed, before the application of the second material.

Such surface treatments may consist of a solution treatment, such as a solvent. If the solvent contains a base, such as 1,8-diaza[5.4.0]bicyclo undec-7-ene (DBU), treatment of the fluoropolymer will result in some degree of dehydrofluorination. Such dehydrofluorination is thought to be beneficial to promote adhesion to subsequently applied materials. This is particularly true when the subsequently applied material contains any agent which is reactive to sites of unsaturation, such as those created by dehydrofluorination.

Other methods of surface treatment include charged atmosphere treatments, such as corona discharge treatment or plasma treatment. Also useful are Electron beam treatment (E-beam). Such E-beam treatments may also be useful to promote the cure desired in the elastomer component. This step would preferably take place after the article is formed.

The methods of the present invention provide multi-layer articles exhibiting ease of processability and improved interlayer adhesive bond strength between a fluoropolymer layer and a curable elastomer layer. Multi-layer articles of the present invention can have usefulness in articles such as films, gaskets, containers, and tubing or hoses that require specific combinations of barrier properties, high and low temperature resistance, and chemical resistance in articles with improved interlayer adhesion. The methods and compositions of this invention are particularly useful for making multi-layer articles suitable for use in motor vehicles, for example as fuel-line hoses, and for films and blow-molded articles such as fuel tanks or bottles, where chemical resistance and barrier properties are important.

The multi-layer articles of the present invention can have two, three, or even more separate layers. For example, the present invention contemplates a multi-layer article including a fluoropolymer layer, a curable elastomer layer, and optionally further comprising one or more additional layers comprising fluorinated or non-fluorinated polymers. As a specific example, a bi-layer article can be prepared according to the present invention, the bi-layer article comprising a fluoropolymer layer and an epichlorohydrin (ECO) containing layer, wherein the described dehydrofluorinating composition is mixed into the ECO containing layer. One or more additional layers comprising a fluorinated or non-fluorinated polymer can, either thereafter or simultaneously be bonded to one or more of the fluoropolymer layer or the epichlorohydrin containing layer, to produce a multi-layer article having three or more layers.

EXAMPLES

In the following examples and comparative examples multi-layer articles were prepared and the adhesion between the layers was evaluated. All additive concentrations are by weight based on weight of hydrocarbon elastomer (parts per hundred parts rubber (phr)) unless otherwise indicated.

The fluoropolymers FP1 and FP2 were made in a manner similar to the following description with adjustments in monomer levels as specified.

An internally enameled polymerization reactor having a total volume of 195 l, provided with an impeller stirrer, is charged with 120 l. of deionized water, and 500 g. of ammonium perfluorooctanoate (in the form of 1667 g. of a 30% strength solution in water, commercial product of the 3M Company), 242 g. of diammonium oxalate monohydrate and 69 g. of oxalic acid monohydrate are dissolved therein. After sealing the reactor, it is first flushed five times with nitrogen and subsequently once with 1 bar of TFE.

After depressurization and heating to 43° C., 10 g. of n-pentane and 9 kg. of HFP are pumped in via a line under moderate stirring. The stirring is then increased to 210 rpm and 2.05 kg. of TFE and 133 g. of ET are fed into the reactor via the gas phase, so that a total pressure of 17 bar is achieved.

The polymerization is then initiated by pumping in a solution of 5 g. of potassium permanganate in 250 ml. of water and maintained by continuously feeding in 14 g. of potassium permanganate, dissolved in 0.7 l. of water, per hour. The total monomer pressure of 17 bar is automatically maintained by continuous feeding in of a mixture having a molar ratio of TFE:ET:HFP=2.3:1.7:61.

The reaction is stopped at a copolymer solids content, based on aqueous reaction medium used, of about 21% by venting of the monomer mixture.

The dispersion is then coagulated by means of the rapidly running stirrer. The precipitated copolymer solid is separated off from the liquor, washed a number of times with water, dried in a nitrogen atmosphere for 15 hours at 110° C. and subsequently melt granulated.

Example 1

In Example 1, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black (Huber), 1.0 phr stearic acid (EM Sciences), 1.0 phr nickel diisobutyldithiocarbamate (NBC), 1.0 phr nickel dimethyldithiocarbamate (NMC), both from Vanderbilt, 5 phr Dyphos (Associated Lead, Inc.), 0.5 phr Sulfasan (Monsanto) and 1.0 phr ethylene thiourea (Aldrich Chemicals). To this compound was added 5.0 phr calcium oxide powder (C.P. Hall) and 3.0 phr Dynamar™ Rubber Chemical FX-5166, an organo-phosphonium compound commercially available from Dyneon LLC.

A sheet about 2.5 mm thick was formed from the ECO compound by using a two-roll mill. Composite samples were prepared with the ECO sheet and a fluoropolymer consisting of a 375 micron thick film of a copolymer of tetrafluoroethylene (TFE), hexafluoropropylene (HFP) and ethylene (E), having a melt point of 168° C. This fluoropolymer (FP1) had monomer concentration by weight of 24% HFP, 62% TFE and 14% ethylene.

The adhesion between the layers was tested using ASTM D-1876, commonly known as a "T-peel" test. To facilitate testing, a piece of 75 micron thick polyester (PET) film coated with a silicone release agent was placed between the ECO compound and the fluoropolymer layer along one edge. The release-coated PET film was inserted about 1.25 cm along the short edge of the 2.5 cm by 7.6 cm sample. The sheet of polyester did not adhere to either of the layers and was used only to create a fluoropolymer "tab" and a ECO "tab" to insert into the jaws of the test device.

The resulting 1 inch (2.54 cm) by 3 inch (7.62 cm) composites were heated under pressure using a Wabash Hydraulic Press Co. heated platen press at 320° F. (160° C.) and 100 psi (0.7 MPa) for 45 minutes. The samples were removed from the press and allow to cool to room temperature. Peel strength or adhesion was measured on the strips in accordance with ASTM D 1976 (T-Peel Test). An Instron™ Model 1125 tester, available from Instron Corp., set at a 4 inch/min (10.16 cm/Min) crosshead speed was used as the test device. The peel strength was calculated as the average load during testing, and the value reported was the average of the samples. The average peel strength on the strips from Example 1 is reported in Table 1.

Comparative Example C1

In Comparative Example C1, a sample was prepared and tested as in Example 1 except that no FX-5166 and calcium oxide was added to the ECO compound. Test results are reported in Table 1.

Example 2

In Example 2, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black (Huber), 1.0 phr stearic acid (EM Sciences, 1.0 phr NBC (Vanderbilt), 1.0 phr NMC (Vanderbilt), 5 phr Dyphos (Associated Lead, Inc.) and 1.0 phr FC-5157, a 4-4'sulfonyl bisphenol compound available from Dyneon LLC. To this compound was added 5.0 phr calcium oxide powder (C.P. Hall) and 3.0 phr FX-5166, available from Dyneon LLC. Composite samples of this elastomer and FP1 were prepared and tested as in Example 1. Test results are reported in Table 1.

Example 3

In Example 3, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black (Huber), 1.0 phr stearic acid (EM Science) 1.0 phr nickel diisobutyldithiocarbamate (NBC), 1.0 phr nickel dimethyldithiocarbamate (NMC), both available from Vanderbilt, 5 phr Dyphos (Associated Lead Inc.), 0.5 phr Sulfasan (Monsanto), and 1.0 phr ethylene thiourea (Aldrich Chemical). To this compound was added 5.0 phr calcium hydroxide powder (C.P. Hall) and 2.0 phr tetrabutyl ammonium chloride available from Aldrich Chemical. Composite samples of this elastomer and FP1 were prepared and tested as in Example 1. Test results are reported in Table 1.

Example 4

In Example 4, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black (Huber), 2.5 phr stearic acid (EM Science) 1.0 phr nickel diisobutyldithiocarbamate (NBC), 1.0 phr nickel dimethyldithiocarbamate (NMC), both available from Vanderbilt, 5 phr Dyphos (Associated Lead Inc.), 0.5 phr Sulfasan (Monsanto), and 1.0 phr ethylene thiourea (Aldrich Chemical). To this compound was 1.5 phr of 1,5diazabicyclo[4.3.0]non-5-ene (DBN) available from Aldrich Chemical. Composite samples of this elastomer and FP1 were prepared and tested as in Example 1. Test results are reported in Table 1.

Comparative Example C2

In Comparative Example C2, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black (Huber), 2.5 phr stearic acid (EM Science) 1.0 phr nickel diisobutyldithiocarbamate (NBC), 1.0 phr nickel dimethyldithiocarbamate (NMC), both available from Vanderbilt, 5 phr Dyphos (Associated Lead Inc.), 0.5 phr Sulfasan (Monsanto), and 1.0 phr ethylene thiourea (Aldrich Chemical). To this compound was added 1.5 phr of 1,5 diazabicyclo[4.3.0]non-5-ene (DBN) available from Aldrich Chemical. Composite samples were prepared and tested as in Example 1 except that the fluoropolymer was replaced with a copolymer made in a manner similar to FP1 except the monomer ratios were HFP 20%, TFE 56% and ethylene 14%. The melt point of this polymer (FP2) was determined to be 207° C. Test results are reported in Table 1.

TABLE 1

Summary of ECO Peel Test Results

| Example # | ECO Composition | Fluoro-polymer | Peel (Newtons/cm of width) |
|---|---|---|---|
| 1 | ETU curative + FX-5166 + calcium oxide | FP1 | 45.6 |
| C1 | ETU curative | FP1 | No Bonding |
| 2 | Bisphenol curative + FX-5166 + calcium oxide | FP1 | 36.9 |
| 3 | ETU curative + tetrabutyl ammonium chloride + calcium hydroxide | FP1 | 35.1 |
| 4 | ETU curative + DBN | FP1 | 28.7 |
| C2 | ETU curative + DBN | FP2 | No Bonding |

The data in Table 1 indicates the advantage of the compositions of the invention as shown by the improved peel strength. The indication of "No Bonding" means the samples delaminated when they were inserted in the test device.

Example 5

In Example 5, a 0.1 Kg sample of sulfur curable nitrile rubber compound was prepared using conventional methods with a two-roll mill by compounding Nipol™ 1052 acrylonitrile butadiene rubber (NBR), available from Zeon, Inc., with 44 phr N-990 Carbon Black (Huber), 1.0 phr nickel diisobutyldithiocarbamate (NBC) (Vanderbilt), 2.0 phr 2-mercaptobenzothiazole (MBT) (Monsanto), 1.0 phr tetramethylthiuram monosulfide (TMTM) (Monsanto) and 1.0 phr sulfur (Fisher). To this compound was added 2.2 phr 1,8-diazabicyclo[5.4.0]undec-7-ene (DBU) and 2.2 phr 2-Napthol, both Available from Aldrich Chemical.

A sheet about 2.5 mm thick was formed from the NBR compound by using a two-roll mill. Composite samples were prepared with the NBR sheet and a 375 micron thick film of a fluorinated copolymer FP1.

The adhesion between the layers was tested using ASTM D-1876, commonly known as a "T-peel" test. To facilitate testing, a piece of 3 mil (75 μm) polyester (PET) film coated with a silicone release agent was placed between the NBR compound and the fluoropolymer layer along one edge. The release-coated PET film was inserted about 1.25 cm along the short edge of the 2.54 cm by 7.62 cm (1 inch by 3 inch) sample. The sheet of polyester did not adhere to either of the layers and was used only to create a fluoropolymer "tab" and a NBR "tab" to insert into the jaws of the test device.

The resulting 2.54 cm by 7.62 cm composites were heated under pressure using a Wabash Hydraulic Press Co. heated platen press at 160° C. (320° F.) and 0.7 MPa (100 psi) for 45 minutes. The samples were removed from the press and allow to cool to room temperature. Peel strength or adhesion was measured on the strips in accordance with ASTM D 1976 (T-Peel Test). An Instron™ Model 1125 tester, available from Instron Corp., set at a 10.16 cm/min (4 inch/min) crosshead speed was used as the test device. The peel strength was calculated as the average load during testing, and the value reported was the average of the samples. The average peel strength on the strips from Example 5 is reported in Table 2.

Comparative Example C3

In Comparative Example C3, a composite sample of NBR and FP1 was prepared and tested as in Example 5 except that no DBU or 2-Napthol was added to the nitrile rubber compound. Results for Comparative Example C3 are reported in Table 2.

Example 6

In Example 6, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black (Huber), 3.0 phr Maglite D (C.P. Hall), 3.0 phr calcium oxide (C.P. Hall), 3.5 phr Lupercom™ 101XL (Elf Atochem North America Inc.), 1.0 phr HVA-2 (Dupont) and 0.5 phr triallyl isocyanurate (TAIC) (American Cyanamid Co.). To this compound was added 2.2 phr 1,5diazabicyclo[4.3.0]non-5-ene (DBN) and 2.2 phr 2-Napthol, both available from Aldrich Chemical.

Composite sample of this NBR and the fluoropolymer FP1 were prepared and tested as in Example 5. The test results for Example 6 are reported in Table 2.

Comparative Example C4

In Comparative Example C4, a sample was prepared and tested as in Example 6 except that no DBN or 2-Napthol was added to the nitrile rubber compound. Results for Comparative Example C4 are reported in Table 2.

Example 7

In Example 7, a 0.1 Kg sample of nitrile rubber compound was prepared using conventional methods with a two-roll mill by compounding Nipol™ 1052 acrylonitrile butadiene rubber (NBR), available from Zeon, Inc., with 44 phr N-990 Carbon Black (Huber), 1.0 phr nickel diisobutyldithiocarbamate (NBC) (Vanderbilt), 2.0 phr 2-mercaptobenzothiazole (MBT) (Monsanto), 1.0 phr tetramethylthiuram monosulfide (TMTM) (Monsanto) and 1.0 phr sulfur (Fisher). To this compound was added 2.2 phr 1,8-diazabicyclo[5.4.0]undec-7-ene (DBU) (Aldrich Chemical) and 2.2 phr Dynamar™ PPA-791 available from Dyneon LLC.

Composite samples of this NBR and fluoropolymer FP1 were prepared and tested as in Example 5. The test results for Example 7 are reported in Table 2.

Example 8

In Example 8, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black (Huber), 3.0 phr Maglite D (C.P. Hall), 3.0 phr calcium oxide (C.P. Hall), 3.5 phr Luperco™ 101XL (Elf Atochem North America Inc.), 1.0 phr HVA-2 (Dupont) and 0.5 phr triallyl isocyanurate (TAIC) (American Cyanamid Inc.). To this compound was added 2.0 phr DBU and 2.0 phr stearic acid, both available from Aldrich Chemical.

Composite sample of this NBR and fluoropolymer FP1 were prepared and tested as in Example 5. The test results for Example 8 are reported in Table 2.

Example 9

In Example 9, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 3.0 phr Maglite D, 3.0 phr calcium oxide, 3.5 phr Luberco™ 101XL, 1.0 phr HVA-2 and 0.5 phr triallyl isocyanurate (TAIC). To this compound was added 2.0 phr DBU, 2.0 phr stearic acid, and 2.0 phr FX-5166, an organo phosphonium compound available from Dyneon LLC.

Composite sample of this NBR and fluoropolymer FP1 were prepared and tested as in Example 5. The test results for Example 9 are reported in Table 2.

Example 10

In Example 10, a 0.1 Kg sample of peroxide curable nitrile rubber compound was prepared using conventional methods with a two-roll mill by compounding Krynac™ acrylonitrile butadiene rubber (NBR), available from Bayer Corp. (Akron, Ohio), with 100 phr N-990 Carbon Black 2.0 phr Luberco™ 101XL, and 0.5 phr triallyl isocyanurate (TAIC). To this compound was added 5.0 phr Dynamar™ FX-5 166, 5.0 phr Hycar™ 1300×42 amine terminated butadiene available from BF Goodrich, and 5.0 phr calcium hydroxide (CP Hall).

Composite sample of this NBR and fluoropolymer FP1 were prepared and tested as in Example 5. The test results for Example 10 are reported in Table 2.

Example 11

In Example 11, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 3.0 phr Maglite D, 3.0 phr calcium oxide, 3.5 phr Luberco™ 101XL, 1.0 phr HVA-2 and 0.5 phr triallyl isocyanurate (TAIC). To this compound was added 3.3 phr of ZEONET PB™, said to be a benzotriazolate phosphonium (Zeon Chemical, Louisville, Ky.) and 8.3 phr calcium hydroxide (C.P. Hall).

Composite sample of this NBR and fluoropolymer FP1 were prepared and tested as in Example 5. The test results for Example 11 are reported in Table 2.

Comparative Example C5

In Example C5, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 3.0 phr Maglite D, 3.0 phr calcium oxide, 3.5 phr Luberco™ 101XL, 1.0 phr HVA-2 and 0.5 phr triallyl isocyanurate (TAIC). To this compound was added 3.3 phr of ZEONET PB™, said to be a benzotriazolate phosphonium (Zeon Chemical, Louisville, Ky.) and 8.3 phr calcium hydroxide (C.P. Hall).

Composite samples were prepared and tested as in Example 5, except that the fluoropolymer FP1 was replaced with fluoropolymer FP2. Test results are reported in Table 2.

Example 12

In Example 12, a 0.1 Kg sample of peroxide curable nitrile rubber compound was prepared using conventional methods with a two-roll mill by compounding Krynac™ acrylonitrile butadiene rubber (NBR), available from Bayer Corp. (Akron, Ohio), with 100 phr N-990 Carbon Black, 2.0 phr Lubercor™ 101XL, and 0.5 phr triallyl isocyanurate (TAIC). To this compound was added 2.5 phr tetrabutyl ammonium chloride, available from Aldrich Chemical (Milwaukee, Wis.), 5.0 phr Hycar™ 1300×42 amine terminated butadiene available from BF Goodrich, and 5.0 phr calcium hydroxide (CP Hall).

Composite sample of this NBR and fluoropolymer FP1 were prepared and tested as in Example 1. The test results for Example 12 are reported in Table 2.

TABLE 2

Summary of NBR Peel Test Results

| Example # | NBR Composition | Fluoropolymer | Peel (Newtons/cm of width) |
|---|---|---|---|
| 5 | S curative + DBU + 2-Napthol | FP1 | 16.9 |
| C3 | S curative | FP1 | No Bonding |
| 6 | Peroxide curative + DBN + 2-Napthol | FP1 | 35.1 |
| C4 | Peroxide curative | FP1 | No bonding |
| 7 | Peroxide curative + DBU | FP1 | 16.9 |
| 8 | Peroxide curative + DBU + Stearic Acid | FP1 | 10.4 |
| 9 | Peroxide curative + DBU + Stearic Acid + FX 5166 | FP1 | 14.0 |
| 10 | Peroxide curative + Hycar 1300×42 + FX 5166 | FP1 | 10.4 |
| 11 | Peroxide curative + ZEONET PB ™ | FP1 | 42.9 |
| C5 | Peroxide curative + ZEONET PB ™ | FP2 | No Bonding |
| 12 | Peroxide curative + Hycar ™ 1300×42 + tetrabutyl ammonium chloride | FP1 | 3.73 |

The data in Table 2 indicates the advantage of the compositions of the invention as shown by the improved peel strength. The indication of "No Bonding" means the samples delaminated when they were inserted in the test device.

What is claimed is:

1. A method of bonding a fluoropolymer to a curable elastomer comprising the steps of:
   a) providing; (i) a fluoropolymer layer comprising a fluorine-containing polymer derived from interpolymerized units of at least one fluorine-containing olefinically unsaturated monomer, with the proviso that if a perfluorinated monomer is present then at least one monomer that contains hydrogen atoms is also present and with the further proviso that the monomer(s) include neither vinylidene fluoride nor monomers which when polymerized form a micro structure similar to polymerized vinylidene fluoride, (ii) a curable elastomer, and (iii) a dehydrofluorinating composition,
   b) forming a layer comprising a mixture of the curable elastomer and an effective amount of the dehydrofluorinating composition,
   c) forming a multi-layer article by contacting the layer of the mixture with the layer comprising the fluoropolymer, and
   d) curing the multi-layer article under conditions sufficient to provide an interlayer adhesion between the curable elastomer layer and the fluoropolymer layer of at least 2 Newtons/cm of width.

2. A method according to claim 1, wherein the organo onium comprises a phosphonium.

3. A method according to claim 2, wherein the amidine comprises 1,8-diazabicyclo[5.4.0]undec-7-ene or salts thereof.

4. A method according to claim 1, wherein the dehydrofluorinating composition comprises both an organo onium and an amidine.

5. A method according to claim 1, wherein the curable elastomer is selected from the group consisting of at least one of an epichlorohydrin-containing elastomer, a nitrile rubber-containing elastomer, ethylene propylene diene copolymers, silicone-containing elastomers, fluoroelastomers, and mixtures thereof.

6. A method of bonding a fluoropolymer to a curable elastomer comprising the steps of:
   a) providing; (i) a layer of a fluoropolymer comprising a copolymer derived from interpolymerized units of a first monomer selected from the group consisting of hexafluoropropylene, a perfluoroalkyl vinyl ether, a branched perfluorinated monomer, and combinations thereof; a second monomer selected from the group consisting of tetrafluoroethylene, chlorotrifluoroethylene, a fully halogenated olefinically unsaturated monomer containing two carbon atoms and combinations thereof; a third monomer selected from the group consisting of ethylene, propylene, a non-halogenated olefinically unsaturated monomer and combinations thereof, (ii) a curable elastomer, and (iii) a dehydrofluorinating composition,
   b) forming a layer comprising a mixture of the curable elastomer and an effective amount of the dehydrofluorinating composition,
   c) forming a multi-layer article by contacting the layer of the mixture with the layer comprising the fluoropolymer, and
   d) curing the multi-layer article under conditions sufficient to provide an interlayer adhesion between the curable elastomer layer and the fluoropolymer layer of at least 2 Newtons per cm of width.

7. A method according to claim 6, wherein the curable elastomer is selected from the group consisting of an epichlorohydrin-containing elastomer, a nitrile rubber-containing elastomer, ethylene propylene diene copolymers, silicone-containing elastomers, fluoroelastomers, and mixtures thereof.

8. A method according to claim 6, wherein the third monomer comprises ethylene.

9. A method according to claim 6, wherein the first monomer comprises hexafluoropropylene.

10. A method according to claim 6, wherein the second monomer component comprises tetrafluoroethylene.

11. A method according to claim 6, wherein the first monomer comprises hexafluoropropylene, the second monomer comprises tetrafluoroethylene and the third monomer comprises ethylene.

12. A method of bonding a fluoropolymer to a curable elastomer comprising the steps of:
   a) providing; (i) a layer of a fluoropolymer comprising a copolymer having a melt point of no more than 190° C. and derived from interpolymerized units comprising hexafluoropropylene, tetrafluoroethylene, and ethylene, (ii) a curable elastomer, and (iii) a dehydrofluorinating composition,
   b) forming a layer comprising a mixture of the curable elastomer and an effective amount of the dehydrofluorinating composition,
   c) forming a multi-layer article by contacting the layer of the mixture with the layer comprising the fluoropolymer, and
   d) curing the multi-layer article.

13. A method according to claim 12 wherein the melt point of the fluoropolymer is no more than 170° C.

14. A method of bonding a fluoropolymer to a curable elastomer comprising the steps of
   a) providing; (i) a layer of a fluoropolymer comprising a copolymer derived from interpolymerized units comprising hexafluoropropylene, tetrafluoroethylene, and ethylene, having a hexafluoropropylene monomer content of at least 22% by weight and an ethylene monomer content of at least 14% by weight, (ii) a curable elastomer, and (iii) a dehydrofluorinating composition,
   b) forming a layer comprising a mixture of the curable elastomer and an effective amount of the dehydrofluorinating composition,
   c) forming a multi-layer article by contacting the layer of the mixture with the layer comprising the fluoropolymer polymer, and
   d) curing the multi-layer article.

15. A method according to claim 14, wherein the hexafluoropropylene monomer content is at least 24%.

16. A method according to claims 1, 6, 12 or 14 wherein at least one of the fluoropolymer layer or the curable elastomer layer is subjected to one or more surface treatments prior to contacting them with each other to form the multilayer article.

* * * * *

UNITED STATES PATENT AND TRADEMARK OFFICE
CERTIFICATE OF CORRECTION

PATENT NO.    : 6,833,043 B1
DATED         : December 21, 2004
INVENTOR(S)   : Parsonage, Edward E.

It is certified that error appears in the above-identified patent and that said Letters Patent is hereby corrected as shown below:

Column 6,
Line 6, "thereof" should be shown as -- thereof. --

Column 8,
Line 33, "HFP)" should be shown as -- HFP --

Column 11,
Line 7, "2.3:1.7:61." should be shown as -- 2.3:1.7:1. --

Column 14,
Line 16, "Lupercom™" should be shown as -- Luperco™ --

Column 15,
Line 22, "FX-5 166," should be shown as -- FX-5166, --

Column 16,
Lines 39-48, "a fluorine-containing polymer derived from interpolymerized units of at least one fluorine-containing olefinically unsaturated monomer, with the proviso that if a perfluorinated monomer is present then at least one monomer that contains hydrogen atoms is also present and with the further proviso that the monomer(s) include neither vinylidene fluoride nor monomers which when polymerized form a micro structure similar to polymerized vinylidene fluoride" should be shown as -- a fluoropolymer having less than 3% by weight of interpolymerized units derived from vinylidene fluoride or a monomer that gives a substantially similar microstructure to polymerized vinylidene fluoride when polymerized --
Line 51, delete the words "an effective amount of"
Line 52, after "composition", insert the following: -- wherein the dehydrofluorinating composition is selected from the group consisting of at least one of an organo-onium and an amidine, --
Line 53, between the words "contacting" and "the" insert the word -- intimately --
Line 56, after "article" insert -- , wherein --
Lines 56-57, delete the words "under conditions sufficient to provide"
Line 58, "of should be -- is --
Line 62, "claim 2," should be -- claim 1, --

UNITED STATES PATENT AND TRADEMARK OFFICE
CERTIFICATE OF CORRECTION

PATENT NO. : 6,833,043 B1
DATED : December 21, 2004
INVENTOR(S) : Parsonage, Edward E.

It is certified that error appears in the above-identified patent and that said Letters Patent is hereby corrected as shown below:

Column 17,
Line 24, delete the words "an effective amount of"
Line 25, after composition, insert the following: -- wherein the dehydrofluorinating composition is selected from the group consisting of at least one of an organo-onium and an amidine, --
Line 26, between the words "contacting" and "the" insert the word -- intimately --
Line 29, after "article" insert -- , wherein --
Lines 29-30, delete the words "under conditions sufficient to provide"
Line 31, "of" should be -- is --

Column 18,
Line 13, delete the words "an effective amount of"
Line 14, after "composition", insert the following: -- wherein the dehydrofluorinating composition is selected from the group consisting of at least one of an organo-onium and an amidine, --
Line 15, between the words "contacting" and "the" insert the word -- intimately --
Line 33, delete the words "an effective amount of"
Line 34, after "composition", insert the following: -- wherein the dehydrofluorinating composition is selected from the group consisting of at least one of an organo-onium and an amidine, --
Line 35, between the words "contacting" and "the" insert the word -- intimately --

Signed and Sealed this

Nineteenth Day of April, 2005

JON W. DUDAS
*Director of the United States Patent and Trademark Office*